Patented Dec. 8, 1925.

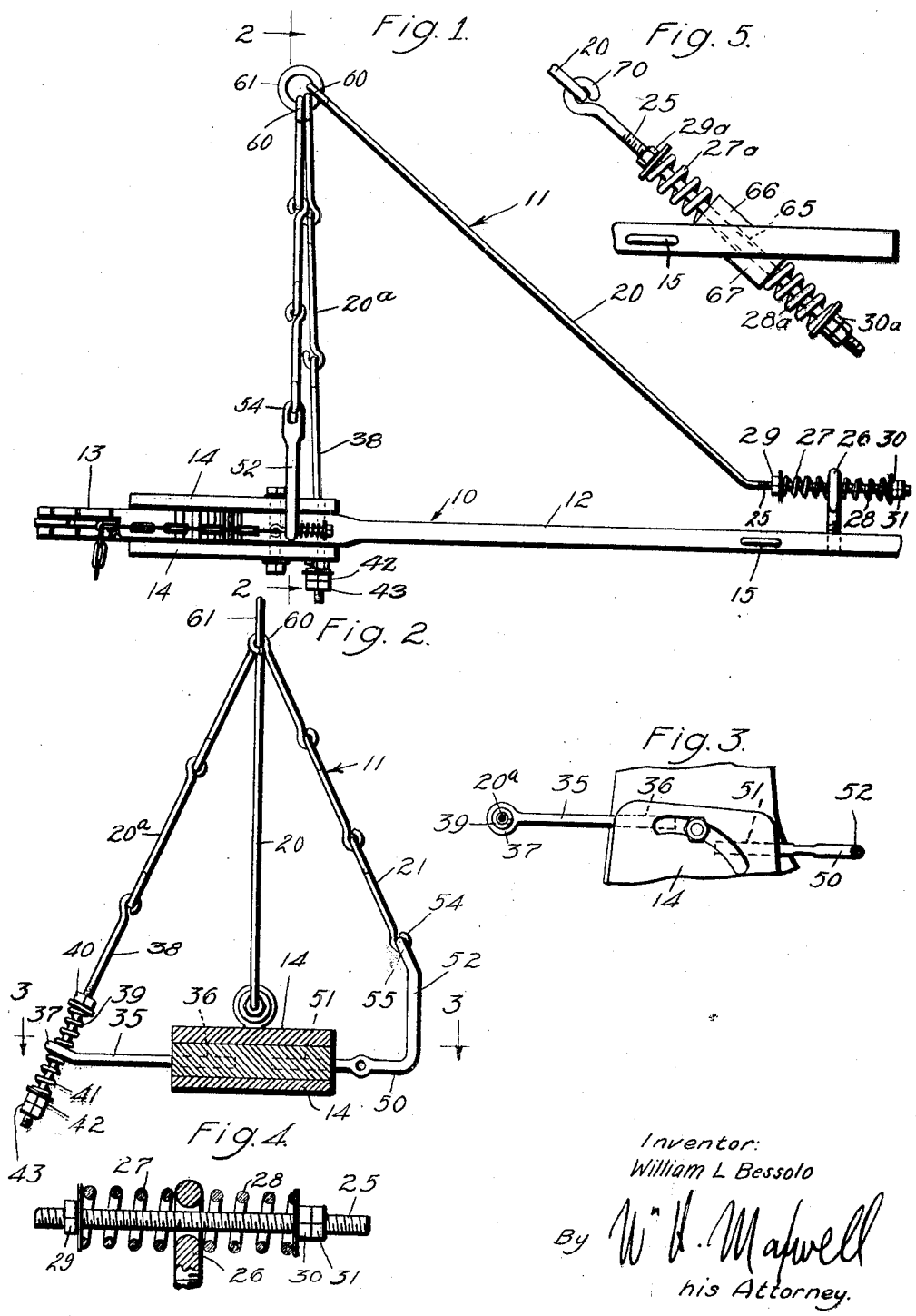

1,564,511

UNITED STATES PATENT OFFICE.

WILLIAM L. BESSOLO, OF CLEARWATER, CALIFORNIA.

SUPPORTING MEANS FOR TOOLS.

Application filed October 4, 1922. Serial No. 592,364.

*To all whom it may concern:*

Be it known that I, WILLIAM L. BESSOLO, a citizen of the United States, and a resident of Clearwater, county of Los Angeles, California, have invented new and useful Improvements in Supporting Means for Tools, of which the following is a full, clear, and accurate disclosure.

This invention relates to supporting means for tools, such, for instance, as casing tongs, and it is an object of this invention to provide a simple, effective means of this character which will greatly simplify the handling of the tools and will not interfere with their operation.

Tongs, such as are used on well casings, are heavy and cumbersome, making it necessary to support them by means of a line, or the like, so that they can be handled with reasonable ease and speed. However, in practice with ordinary supporting means it is almost always necessary for the operator to turn or twist the tongs one way or another in order to get it into position to properly engage the casing. This not only involves considerable time and labor but frequently causes the tongs to improperly engage the casing so that it slips upon being operated.

It is an object of this invention to provide a supporting means for a tongs, or the like, which will support the tongs from a single line in a manner so that it can be swung into engagement with a casing without twisting or without laborious manipulation.

Another object of this invention is to provide a supporting means for a tongs which supports the tongs more or less yieldingly or flexibly so that it can properly center itself on a casing when it is applied to the casing and during operation.

The various objects and features of my invention will be best understood by reference to the following detailed description when taken in connection with the accompanying drawings of a specific embodiment thereof, while its scope will be more particularly pointed out in the appended claims:

Fig. 1 is a side elevation of a typical casing tongs equipped with a suspension means embodying the present invention;

Fig. 2 is a sectional view taken as indicated by line 2—2 on Fig. 1;

Fig. 3 is a plan view of a portion of the tongs being a view taken as indicated by line 3—3 on Fig. 2;

Fig. 4 is an enlarged detail sectional view taken at the connection of the longitudinal supporting member with the outer end portion of the handle of the tongs; and, Fig. 5 is a fragmentary view showing another form of connection between the longitudinal suspension member and the outer end portion of the handle of the tongs.

In the drawings numeral 10 designates, generally, a typical casing tongs such as is commonly used in handling oil well casings, and the like, and numeral 11 designates, generally, the suspension or supporting means provided by the present invention. The tongs 10 which I have illustrated in the drawings comprises a handle 12, and a casing engaging mechanism 13 mounted on the inner end of the handle 12. In the particular tongs illustrated in the drawings the mounting of the casing engaging mechanism 13 on the inner end of the handle 12 includes plates 14 which attach to opposite sides of the inner end portion of the handle 12 and which hold one end of the casing engaging mechanism. Suitable eyes 15 are provided at the outer end portion of the handle 12 so that an operating line can be readily and conveniently connected with the handle. The particular tongs 10 which I have illustrated in the drawings is of the general type more fully set forth and claimed in my co-pending application entitled Pipe tongs, filed December 12th, 1921, Serial Number 521,671, allowed July 7th, 1922. It is to be distinctly understood, however, that the present invention is in no way specifically concerned with the formation or construction of the tongs 10 and that the supporting means provided by the invention may be applied to tongs of various types or styles and to tools other than tongs. It is therefore to be understood that when I use the term "tong" I do not necessarily mean specifically a tongs but that I mean to include any device or devices such as might be the equivalent of tongs or such as might have the general characteristics of tongs.

The supporting means 11 provided by the present invention includes a longitudinal supporting member 20 which is connected with the outer end portion of the handle 12 of the tongs and extends upwardly and inwardly to a point opposite the inner end portion of the handle of the tongs, and two transverse supporting members 20ª and 21 which connect with opposite sides of the inner end portion of the handle 12 of the tongs and extend upwardly and connect with the inner end of the longitudinal supporting member.

In the form of the invention illustrated in Figs. 1 and 4 the longitudinal supporting member 20 has an outer or lower end part 25 which is substantially parallel with the handle 12 and extends through an eye 26 mounted on the outer end portion of the handle 12. The end part 25 extends loosely through the eye 26 and carries two helical springs 27 and 28. The spring 27 is arranged on the inner portion of the part 25 and is confined between the eye 26 and a nut 29 which is screw threaded on the part 25. The spring 28 is carried on the outer portion of the part 25 and is confined between the eye 26 and a nut 30 screw threaded on the part 25. The nut 30 is preferably backed up by a lock nut 31 so that it will not become displaced from the end of the part 25. The construction just described forms an adjustable flexible connection between the longitudinal supporting member and the handle 12. From inspection of the drawings it will be obvious how the longitudinal supporting member can be adjusted bodily relative to the handle by adjusting the nuts on the part 25 and it will be obvious how the degree with which the longitudinal supporting member is resiliently yieldingly, or flexibly, connected with the handle may be readily adjusted by adjusting the nuts on the parts 25. Although it will be obvious that the longitudinal supporting member, between the part 25 and its point of connection with the transverse supporting members, may be of various constructions, I prefer to construct it rigidly and to form it of a rod which is continuous with the part 25.

In accordance with the preferred form of the invention the transverse supporting member 20ª does not connect directly with the side of the inner end portion of the handle 12 but connects with a projection or arm 35 which extends from the side of the handle, as I have clearly illustrated in Figs. 2 and 3 of the drawings. The arm 35 is preferably screw threaded into a suitable opening 36 provided in the side of the handle 12 and is formed at its outer end with an eye 37 which loosely carries the lower end portion 38 of the transverse supporting member 20ª. A helical spring 39 is carried on the end portion 38 between the upper side of the eye 37 and a nut 40 screw threaded on the end portion 38 and a helical spring 41 is carried on the end portion 38 between the lower side of the eye 37 and a nut 42 screw threaded on the portion 38. The nut 42 is preferably backed up by a lock nut 43 so that it cannot become displaced from the lower end of the portion 38. This construction provides an adjustable flexible connection between the lower end of the transverse member and the arm 35. By adjusting the nuts 40 and 42 the transverse connecting member 20ª can be adjusted relative to the arm 35 and the tension on the springs can be adjusted. Although the transverse supporting member may obviously be of various constructions I prefer to form it of several links as I have illustrated in the drawings.

In accordance with the preferred form of the invention the transverse supporting member 21 is not connected directly with the side of the inner portion of the arm but is connected with a projection or arm 50 which extends from the side of the handle 12. The arm 50, which may be connected with the handle 12 by screw threading into a suitable opening 51 provided in the side of the handle, is provided at its outer part with an upwardly extending portion 52 which forms a handle or hand grip for the operator when he is manipulating the tool. Although the transverse supporting part 21 may be connected with the arm 50 in a manner such as I have described in the case of the connection between the transverse connecting part 20ª and the arm 35, I prefer in most cases to simply form the lower end of the supporting member 21 with an eye 54 which cooperates with an eye 55 at the upper end of the handle portion 52. The transverse supporting member 21, like the transverse supporting member 20, is preferably formed of several parts linked together, as I have illustrated in the drawings.

At their upper ends the supporting members may be formed with eyes 60 which carry a single ring 61 which thus connects the upper ends of the supporting members and forms a member to receive the supporting line.

In practice it is desirable to connect the arms 35 and 50 with the handle 12 at points somewhat spaced longitudinally of the handle so that the holes formed in the handle to receive the arms do not materially weaken the handle. Further, I prefer to proportion and adjust the supporting means 11 so that the ring 61 is as nearly as possible directly over the center of gravity of the tongs and supporting means.

In Fig. 5 of the drawings I have shown a construction which may be employed at the connection between the longitudinal supporting member and the outer end portion of the handle 12. In this form of construction the lower end portion 25 of the supporting member extends in the same direction as the rest of the supporting member 20 and extends loosely through an opening 55 formed in the handle 12. A spring 27ª is provided on the inner portion of the part 25 between a suitable beveled washer 66 and a nut 29ª while a spring 28ª is arranged on the outer portion of the part 25 between a suitable beveled washer 67 and a nut 30ª. When this form of construction is employed it is desirable to provide a flexible connection 70 between the part 25 of the longitudinal supporting member and the rest of the longitudinal supporting member so that the supporting means 11 can be collapsed when the tool is not being used.

From the foregoing description of a typical preferred form of my invention it is believed that its operation will be clearly and fully understood. The supporting means 11 may, of course, be applied to tongs after they have been manufactured or it can be manufactured as a part of them. When the tongs is being supported through the supporting means 11 the supporting means is arranged as I have illustrated in the drawings and the supporting line is attached to the ring 61. The tongs can be adjusted endwise to the desired position by adjusting the connection between the longitudinal supporting member and the handle 12 while it can be adjusted or tilted sidewise to the desired position by adjusting the connection between the transverse supporting members and the arm 35. In handling the tongs while it is suspended and when the tongs is applied to a casing the springs embodied in the supporting means allow for more or less flexibility of the tool relative to the supporting means and allow the tool to properly center itself on the casing. When the tongs is not in use, and when it is being transported from place to place or is stored, the suspension means provided by the present invention can be collapsed, due to the loose connections hereinabove described and the flexibility of certain of its parts, so that it does not occupy very much space.

Having described only a typical preferred form of my invention I do not wish to limit myself to the particular details hereinabove set forth but wish to reserve to myself any changes or variations that may appear to those skilled in the art or that may fall within the scope of the following claims.

Having described a preferred form of my invention I claim:

1. In combination with a tongs, a plurality of supporting members connected with the tongs at spaced points and connected together at a point spaced above the tongs, one of the supporting members being adjustably resiliently connected with the tongs.

2. A supporting device for tongs, or the like, including a plurality of members connected with the tongs at spaced points and connected with each other at a point above the tongs, and a spring in connection with one of said members whereby the members flexibly support the tongs.

3. In combination with a tongs, an arm extending from one side of the tongs, and having a handle part, a plurality of supporting members one connected with the arm at a point removed from the tongs the others being connected with the tongs at spaced points, the supporting members being connected with each other at a point above the tongs.

4. In combination with a tongs, an arm extending from one side of the tongs, and having a vertically extending part forming a handle, a plurality of supporting members one connected with the arm at a point removed from the tongs the others being connected with the tongs at spaced points, the supporting members being connected with each other at a point above the tongs.

5. In combination with a tongs, an arm extending from one side of the tongs, and having a vertically extending part forming a handle, a plurality of supporting members one connected with the upper end of said part, the others being connected with the tongs at spaced points, the supporting members being connected with each other at a point above the tongs.

6. In combination with a tongs, a plurality of supporting members connected with the tongs at spaced points and connected together at a point above the tongs, one of the supporting members being flexibly connected with the tongs, one of the members being rigid and having a resilient connection with the tongs and the other members being flexible.

7. In combination with a tongs, an arm extending from one side of the tongs, a plurality of supporting members one slidably connected with the arm at a point removed from the tongs the others being connected with the tongs at spaced points, the supporting members being connected with each other at a point above the tongs, and a spring at the connection between the first mentioned member and the arm to resist relative movement between the arm and said member.

8. In combination with a tongs, an arm extending from one side of the tongs, a plurality of supporting members one slidably connected with the arm at a point removed from the tongs the others being connected with the tongs at spaced points, the supporting members being connected with each other at a point above the tongs, parts on said first mentioned member at opposite sides of the arm, and springs arranged between the arm and said parts.

9. In combination with a tongs having a handle, supporting members connected with opposite sides of the handle at one end thereof, and a rigid supporting member flexibly connected with the other end of the handle, the supporting members being connected together at a point above the tongs.

10. In combination with a tongs having a handle, arms extending from the opposite sides of the handle at one end thereof, one of the arms having a part extending upwardly to form a handle, a supporting member flexibly connected with the other end of the handle, a supporting member connected with the upper end of said part, a supporting member slidably connected with the other of said arms, nuts screw threaded on the last mentioned supporting member at each side of said other arm, and springs carried by the last mentioned supporting member between the nuts and said other arm, the supporting members being connected together at a point above the tongs.

11. A supporting device for tongs including a plurality of supporting members having their upper ends connected together, and their lower ends connected with the tongs, one of the supporting members being rigid, and means whereby the connection at one end of said rigid member is yielding.

12. A supporting device for tongs including two supporting members having their lower ends connected at opposite sides of the tongs at the work engaging end of the tongs and having their upper ends connected together, a rigid supporting member having its lower end connected with the other end of the tongs and having its other end connected with the upper ends of the other supporting members, and means whereby the connection at one end of the rigid supporting member is yielding.

In witness that I claim the foregoing I have hereunto subscribed my name this 20 day of Sept., 1922.

WILLIAM L. BESSOLO.